UNITED STATES PATENT OFFICE.

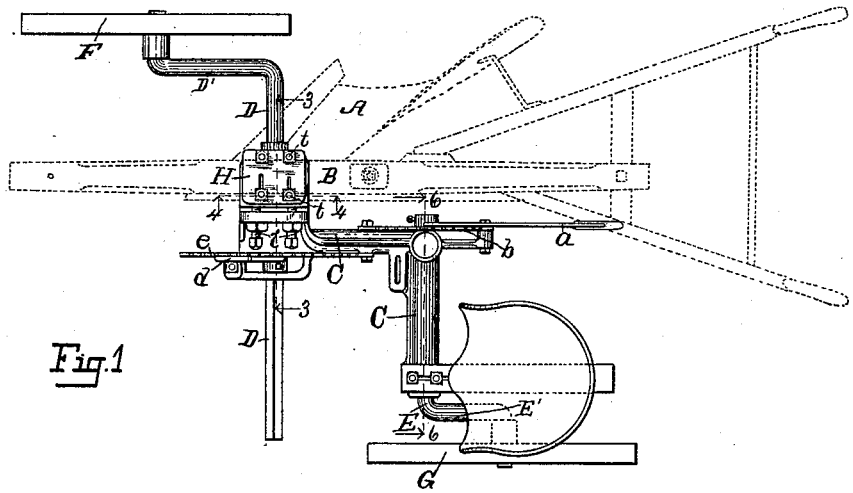

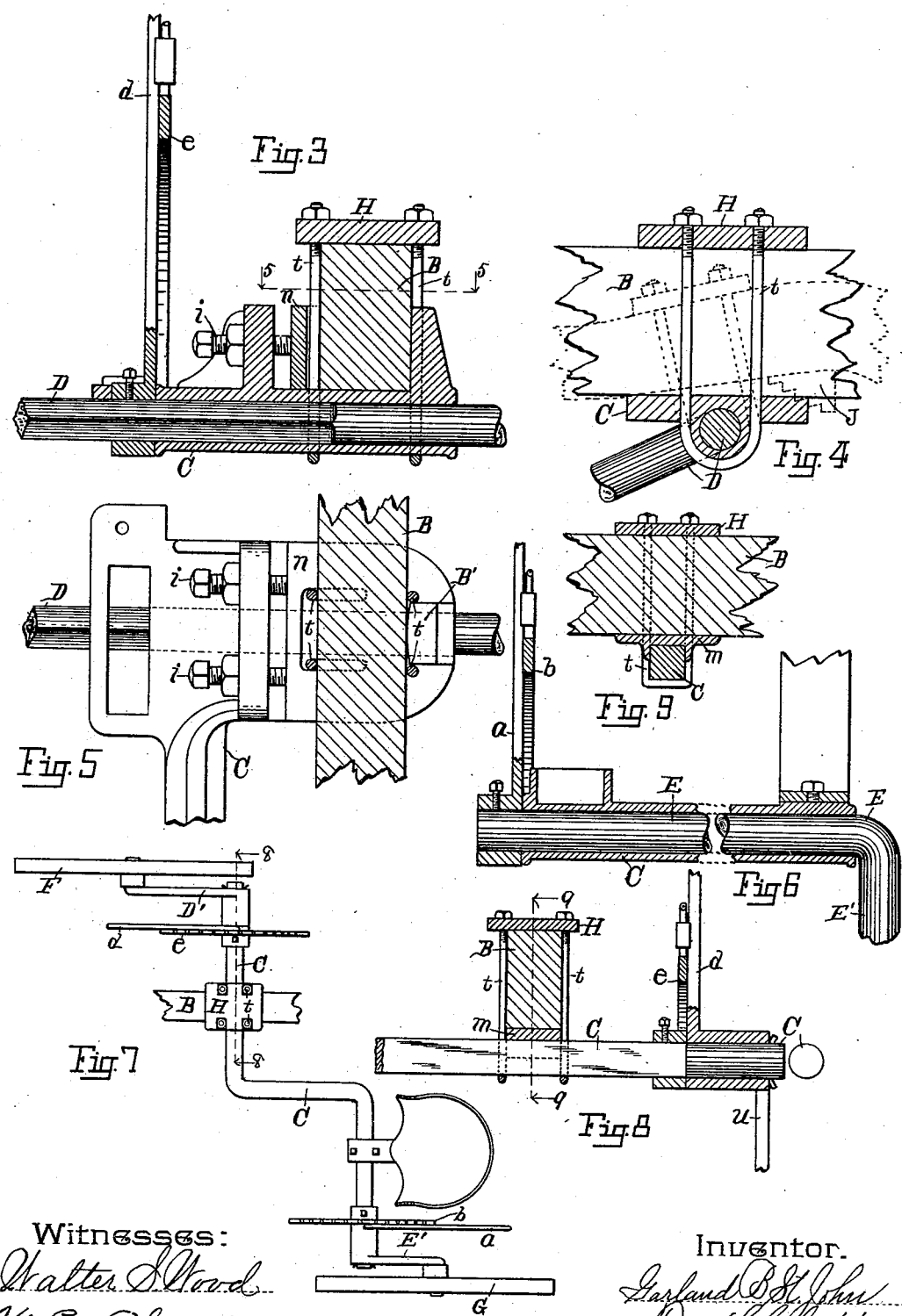

GARLAND B. ST. JOHN, OF KALAMAZOO, MICHIGAN.

PLOW-HOLDER ATTACHMENT.

SPECIFICATION forming part of Letters Patent No. 512,456, dated January 9, 1894.

Application filed October 12, 1893. Serial No. 487,938. (No model.)

*To all whom it may concern:*

Be it known that I, GARLAND B. ST. JOHN, a citizen of the United States, residing at the city of Kalamazoo, in the county of Kalamazoo and State of Michigan, have invented certain new and useful Improvements in Plow-Holder Attachments, of which the following is a specification.

My invention relates to an improved device for holding the ordinary walking plows, and at the same time afford a convenient seat on which the plowman can ride and operate the plow.

The objects of my invention are, first, to provide a wheeled attachment that can be quickly and securely attached to and detached from any walking plow having a beam; that shall be simple, light yet strong and durable for the purpose; second, to provide a wheeled attachment for holding a plow that will need to be attached to the plow at only one place on the beam; third, to provide a wheeled attachment that can be adjusted to any plow beam at any angle to hold the plow in the desired manner; fourth, to provide a wheeled attachment for holding a plow adapted to carry a seat so that the plowman may ride and operate the plow perfectly from the seat or when walking as desired. I accomplish these objects by the mechanism shown in the accompanying drawings, in which—

Figure 1, is a plan view of my invention attached to a plow, the plow being shown in dotted lines. Fig. 2, is a side view of my invention the plow being dotted in. Fig. 3, is a view on line 3—3 of Fig. 1, partly in section. Fig. 4 is a sectional detail view on line 4—4 of Fig. 1. Fig. 5, is a sectional view on line 5—5 of Fig. 3, looking in the direction of the arrows. Fig. 6, is a sectional view on line 6—6 of Fig. 1, looking in the direction of the arrows. Fig. 7, is a view of a modified form of my invention. Fig. 8 is a sectional view on line 8—8 of Fig. 7. Fig. 9 is a sectional view on line 9—9 of Fig. 8. Fig. 10 is a detail view of a modified construction of lever $d$ and its attachment to shaft D. Fig. 11, is a sectional view on line 11—11 of Fig. 10. Fig. 12 is a detail of the collar attaching to lever $d$.

Similar letters of reference refer to similar parts throughout the several views.

My invention is attached to the beam B of any plow as A. It consists of a main frame C that is shaped somewhat like the letter Z with the exception that the angles are right angles or very near to right angles. The front part of the frame C projects across the beam B on its under side and is firmly secured thereto. It carries the shaft D at the end of which the furrow wheel F is mounted. The central portion of the frame C projects back parallel with or nearly parallel with the beam B of the plow and the rear portion projects out at right angles to the landside and carries the shaft E which carries the landside wheel G. The frame C, I attach to the plow beam by means of an adjustable clamp. Where the beam B is straight I use the clamp illustrated in Figs. 3, 4 and 5. This clamp consists of a top plate H placed on top of the beam and U shaped bolts $t$ passing through openings in the plate H and down each side of the beam and encircling the frame C. The holes on one side of the plate H are elongated so that the U shaped bolts $t$ can be placed close to the side of the plow beam B no matter what its width may be. A suitable seat or bearing is prepared on the top of the frame to receive the under side of the plow beam B. One side B' of the seat for the beam B is round next to the beam to admit of adjustment; the other side of the seat for the beam B is composed of an adjustable plate $n$ that can be adjusted to the side of the beam by means of the set screws $i$ so that the frame C cannot be twisted out of place, and can be adjusted to line the frame of the plow holder to suit the angle of the plow beam.

Where the plow beam is curved as it is in many iron beamed plows I provide a notched adjusting block J, (see dotted lines Fig. 4) adapted to be placed between the frame C and the plow beam so that the frame C can be held level or nearly so, as is required for its successful use.

The front and back portion of frame C are hollow sleeves. Passing through these sleeves are the shafts D and E respectively.

The outer end of each shaft is bent like a crank and forms the arms D' and E', the extreme end of each shaft being formed into an axle on which are placed the wheels F and G which carry the plow.

The shaft D is bent forward to form arm D' which carries wheel F. The shaft E is bent back to form arm E' which carries wheel G.

The inner end of shaft D is square and is fitted into a square opening in the end of lever d and is adjustably secured there. This is so that the forward or furrow wheel F can be shifted back and forth so that it will gage the width of the furrow to be cut. The lever d is provided with a catch, operated by the usual grip, and adapted to engage the notched segment e so that the height of the furrow wheel F can be adjusted when plowing different depths and also when the plow is lifted out of the ground. A similar lever a and notched segment b are placed at the inner end of shaft E and used to control the wheel G on the landside of the plow.

It will be noted that when the plow is raised by lowering the wheels F and G the wheels come nearer together and run almost opposite each other when the plow is raised out of the ground.

The seat is attached to the laterally projecting portion of the frame C on the landside of the plow and partially over the landside wheel G which mainly carries the weight of the driver. The shaft D projects in front of it and forms a convenient rest for the feet of the plowman. With the seat in this position the weight of the plowman gives stability to the plow, and he is in the most convenient place for operating it. At the same time his weight over the landside wheel counteracts the pressure against the moldboard taking away nearly all pressure upon the landside.

In the main drawings I show a convenient way of adjusting the lever d on the shaft D. In Figs. 10, 11 and 12, I show a way of accomplishing this object which I prefer. Instead of making the shaft D square in cross section I cut a key seat in the top of it. I construct a collar of two parts adapted to attach to the lever d a portion d' projecting up for that purpose. On the collar is a fin h adapted to slide in the key seat. On the lower half of the collar a lug g projects. The sleeve of the beam C through which shaft D passes is enlarged at the end to permit the collar to rotate in it and an annular groove inside engages the lug g so that when the collar is bolted to the shaft D it will secure the lever and shaft both in the same relative positions. This device dispenses with the necessity of squaring the shaft D and only requires a keyseat to be cut which is a very much cheaper operation.

I desire to say that in the construction of my device the details can be greatly varied without changing my invention. In Figs. 7, 8 and 9, I show such a variation where the parts are greatly simplified. The construction first shown of the Z shaped frame is preferred on account of minor superiorities. In this modified form the frame C is a bar of uniform size bent into the same general form as before, and secured by a clamp across the plow beam, as before. Near the outer ends of each lateral portion collars bearing the notched segments e and b are secured. On the end of the front cross portion a collar is mounted bearing lever d which has a catch operated by a grip to engage the notched segment e and the collar bears a forwardly projecting arm D' which carries the furrow wheel F. The landside wheel G is mounted on rearwardly projecting arm E' and is operated and adjusted by lever a and notched segment b in a similar way to the furrow wheel F. When the frame C is constructed in this way a plate M is placed on the under side of the plow beam B to receive it and the whole is secured by any ordinary clamp.

Having thus described my invention, what I claim as new, and desire to secure by Letters Patent, is—

1. In a wheeled holding attachment for a plow, the combination of the Z shaped frame C with suitable means of attaching it to the beam of a plow, the shaft D having the forwardly projecting arm D' carrying the furrow wheel F, the lever d with notched segment e adjustable on shaft D adapted to rotate the shaft D to adjust the furrow wheel F, the shaft E with the rearwardly projecting arm E' carrying the furrow wheel G, the notched segment b with the lever a adapted to rotate shaft E to adjust wheel G substantially as described for the purpose specified.

2. In a wheeled holder attachment for a plow, the combination of a frame C, the forward axle D, the arm D', the furrow wheel F, the lever d, adjustable on axle D, the landside wheel G, the lever a, the notched segment b, and a suitable seat for the plowman toward the landside of the plow, substantially as described for the purpose specified.

3. In a wheeled holding attachment for a plow, a main frame C having a forward lateral portion adapted to be secured to the beam of a plow, a rear lateral portion projecting out opposite to the landside of the plow and a longitudinal portion between the two, the entire main frame somewhat resembling a letter Z in combination with wheels attached to the ends of the frame with suitable means of adjusting them for the purpose set forth.

4. In a wheeled plow the shaft D bearing the furrow wheel, in combination with the lever d, the adjustable collar having the lug g adapted to the annular groove in the sleeve for the purpose specified.

5. In a wheeled holder attachment for a plow a frame with a portion crossing the plow beam, in combination with the plate H, the U shaped bolts t, the adjustable plate n, the curved side B', and the plate J, as described for the purpose set forth.

6. In a wheeled plow holder attachment, a frame with a portion crossing the plow beam, in combination with a clamp, an adjustable plate $n$, and the curved portion B', for the purpose specified.

In witness whereof I have hereunto set my hand and seal in the presence of two witnesses.

GARLAND B. ST. JOHN. [L. S.]

Witnesses:
C. E. WESTBROOK,
W. G. HOWARD.